United States Patent

Yuito et al.

[11] Patent Number: 5,754,892
[45] Date of Patent: May 19, 1998

[54] LENS-FITTED PHOTO FILM UNIT WITH SLOT FOR CHECKING SHUTTER OPERATION

[75] Inventors: Fumio Yuito; Shinsuke Aoshima; Masaaki Sakaguchi. all of Kanagawa. Japan

[73] Assignee: Fuji Photo Film Co., Ltd.. Kanagawa. Japan

[21] Appl. No.: 621,196

[22] Filed: Mar. 21, 1996

[30] Foreign Application Priority Data

Mar. 22, 1995 [JP] Japan ................................. 7-062539

[51] Int. Cl.$^6$ ................................. G03B 17/42
[52] U.S. Cl. ................................. 396/6; 396/401
[58] Field of Search ................................. 396/6, 401, 415, 396/452, 502

[56] References Cited

U.S. PATENT DOCUMENTS 5,521,669  5/1996  Kamata ................................. 396/401

FOREIGN PATENT DOCUMENTS 2691266  11/1993  France ................................. G03B 19/04
4222356  1/1993  Germany ................................. G03B 19/04

*Primary Examiner*—Howard B. Blankenship
*Attorney, Agent, or Firm*—Sughrue, Mion, Zinn, Macpeak & Seas, PLLC

[57] ABSTRACT

A lens-fitted photo film unit containing photo film having a pair of perforations per frame along through a limited length of frame recording portion available for photographing frames. The photo film is previously drawn from a cassette shell, its trailing end secured to a spool of the cassette shell, so as to be wound into the cassette shell one frame after each exposure. According to the invention, the photo film is drawn from the cassette shell as far as a frame of the frame recording portion that is the nearest to the trailing end, and is set in a position one frame or more farther than an exposure position of the film unit, when loading the photo film in the film unit. A slot is formed through the film unit, for permitting insertion of a tool to set a shutter device to its charged position, without the need for winding the photo film. Alternatively, the shutter device is designed to be charged by use of rotation of a film winding wheel, independently of the perforations.

5 Claims, 15 Drawing Sheets

LENS-FITTED PHOTO FILM UNIT WITH SLOT FOR CHECKING SHUTTER OPERATION

BACKGROUND OF THE INVENTION

1. Field of the Invention

The present invention relates to a lens-fitted photo film unit containing a cassette shell and a scroll of unexposed photo film previously drawn from the cassette shell with its trailing end secured to a spool of the cassette shell, so as to be wound into the cassette shell one frame after each exposure, and more particularly to a lens-fitted photo film unit whose photo film has a pair of perforations per frame along through a limited length of frame recording portion which is available for photographing frames.

2. Background Art

There have been known lens-fitted photographic film units, hereinafter referred to simply as film units, which contain ISO-135 type photo film cassette whose photo film has perforations along through the entire length thereof at regular intervals, i.e., eight per frame.

For winding or advance the ISO-135 photo film frame after frame, the conventional film unit has a one-frame winding mechanism including a film winding wheel and a sprocket wheel with eight teeth. The teeth of the sprocket wheel are sequentially engaged with the perforations of the ISO-135 photo film while the photo film is advanced, so that the sprocket wheel makes one rotation each time the photo film is wound by one-frame. Therefore, the one-frame winding mechanism is designed to lock the film winding wheel and/or the sprocket wheel in response to one rotation of the sprocket wheel. Simultaneously, the rotation of the sprocket wheel is utilized for charging a shutter drive member against a biasing force toward a released position. The film winding wheel and the sprocket wheel are unlocked when the shutter drive mechanism is released. In other words, these elements are interconnected with one another as a one-frame winding shutter-charging mechanism.

In manufacturing the film unit, the photo film unexposed is fully drawn from the cassette shell and wound into a scroll, and the scroll of the photo film and the cassette shell are loaded in the housing of the film unit. Thereafter, the performance of the shutter member is inspected. Because the photo film has the perforations throughout its length, the shutter drive member may be charged through the one-frame winding shutter-charging mechanism by rotating the film winding wheel, i.e., in response to the one-frame winding of the photo film from the initial loading position. The shutter performance test is executed by depressing a shutter release button and measuring the open time of a shutter blade.

After passing the shutter performance test, the film unit in the released position is packed and shipped out for sale, thereby to avoid an accidental exposure during the transportation. Since the film unit is in the released position, the photographer ought to rotate the film winding wheel prior to the first exposure, so as to advance the photo film by one frame to charge the shutter drive member. The first exposure is made onto the most trailing frame, that is, the nearest to a trailer of the photo film. Thus picture frames are photographed from the trailer toward a leader in the film unit. Because the photo film is initially fully drawn from the cassette and is advanced further by one frame after the shutter performance test, the portion of the photo film used for the shutter performance test has no effect on the number of available frames as well as on the quality of the photographed image.

Recently, a new type photo film cassette is suggested whose photo film has a pair of perforations per frame along an edge thereof through a limited length which is available for photographing frames. One perforation of each pair is to indicate a leading end of each frame, and the other is to indicate a trailing end of each frame with respect to the drawing direction from its cassette shell. Accordingly, the perforations are spaced at two intervals which are alternately repeated. The longer of the two intervals is related to the length of each frame. The shorter of the two intervals is related to a space or blank between two adjacent frames. Because the new type photo film has a lot of advantages, it is desirable to produce a film unit containing the new type photo film.

However, because the frame-associated perforations are not provided in a leader and a trailer of the new type photo film, it is impossible for testing the shutter performance to charge a shutter drive member through a one-frame winding shutter-charging mechanism that utilizes rotation of a sprocket wheel engaged in the frame-associated perforation, unless the new type photo film is initially loaded in the film unit with at least one frame-associated perforation located to be engageable with the sprocket wheel. That is, if the shutter drive member should be charged in the conventional manner for the shutter performance test, the most trailing frame, i.e., the frame to be exposed first, would be set on the exposure aperture during the shutter performance test. In that case, since the photo film must be wound by one frame to charge the shutter drive member again prior to the actual photography, the most trailing frame could not be utilized for the actual photography.

OBJECT OF THE INVENTION

In view of the foregoing, a prime object of the present invention is to provide a film unit containing the new type photo film, which allows testing the performance of its shutter mechanism in the last stage of manufacturing, without wasting any available frames of the photo film.

SUMMARY OF THE INVENTION

In a film unit containing a cassette shell and a scroll of unexposed photo film previously drawn from the cassette shell with its trailing end secured to a spool of the cassette shell, so as to be wound into the cassette shell one frame after each exposure, and the photo film has a pair of perforations per frame along through a limited length of frame exposure portion which is available for photographing frames, the present invention provides a film winding device, e.g. a film winding wheel coupled to the spool, which is rotatable for winding photo film into the cassette shell; a shutter device, e.g., a shutter drive member and a shutter blade, for making an exposure when released from a charged position; a winding-lock device for stopping the photo film from being wound when the photo film has been wound by one frame, the winding-lock device being engageable in the perforations; and a slot for permitting insertion of a tool to set the shutter device to the charged position.

In addition, the present invention draws the photo film from the cassette shell as far as a frame of the frame exposure portion that is the nearest to the trailing end of the photo film is set in a position one frame or more farther than an exposure position of the film unit, when loading the photo film in the film unit.

Since the film unit is formed with a slot which permits insertion of an external tool to charge the shutter device, it is unnecessary to wind the photo film prior to a shutter performance test. Because the shutter performance test can be executed in this initial position, all available frames of the photo film are useful for photography.

According to a preferred embodiment of the present invention, the shutter device is designed to be charged by a mechanism which cooperates with the film winding device such that the shutter device is set to the charged position while the photo film is being wound one frame or less by rotating the film winding device.

In this variation, it is alternatively possible to charge the shutter drive member by rotating the film winding device for the shutter performance test, if only the photo film is initially drawn from the cassette shell to an extent enough to permit winding the photo film back into the cassette shell by a length necessary for charging the shutter device, while keeping the frame nearest to the trailing end away from the exposure position sufficiently enough to permit winding the photo film again after the shutter performance test by the length necessary for charging the shutter device on or before the frame nearest to the trailer being set in the exposure position.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein:

FIGS. 12A to 12F are explanatory plan views illustrating the operation of the one-frame winding and shutter-charging mechanism of FIG. 11, wherein FIG. 12A illustrates an initial position, FIG. 12B illustrates a charging position, FIG. 12C illustrates a position the photo film is locked and a shutter drive member is charged, FIG. 12D illustrates a release start position, FIG. 12E illustrates a release finish position, FIG. 12F illustrates a position where the photo film starts to be wound after the exposure;

DETAILED DESCRIPTION OF THE PREFERRED EMBODIMENTS

Figure 1:
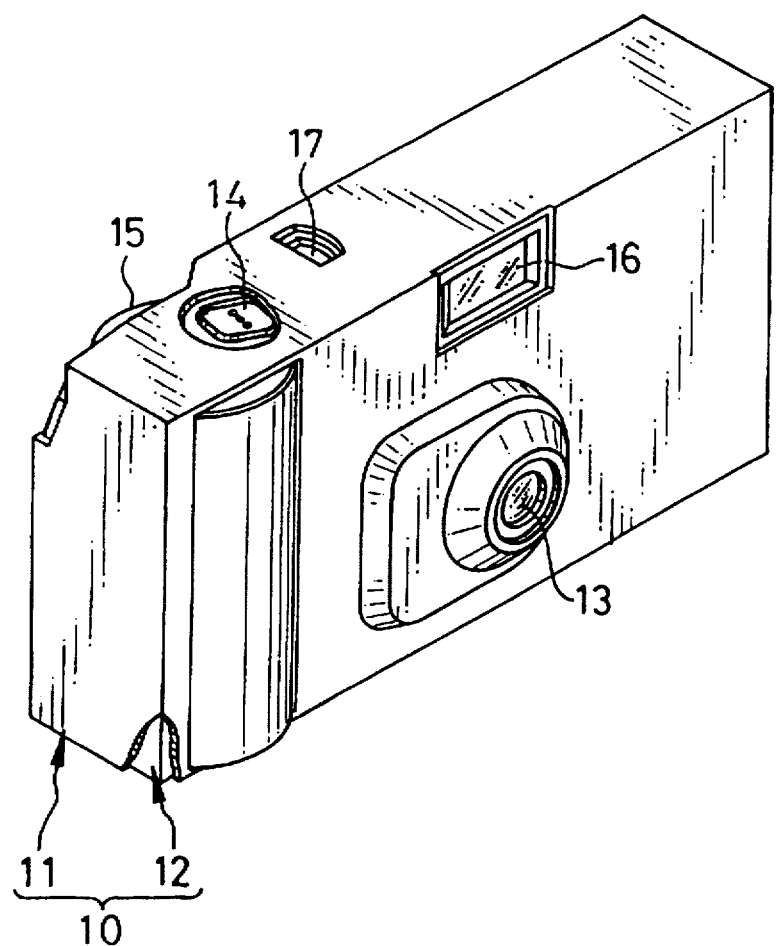
FIG. 1 is a perspective view illustrating a film unit.

FIG. 1 shows a lens-fitted photo film unit 10, hereinafter referred to simply as a film unit 10, according to an embodiment of the present invention. The film unit 10 is generally constituted by a cardboard packing case 11 and a film unit housing 12. The cardboard packing case 11 has openings through which there appear a taking lens 13, a shutter release button 14, a winding wheel 15, a finder window 16, and an indicator window 17 for a frame counter.

Figure 2:
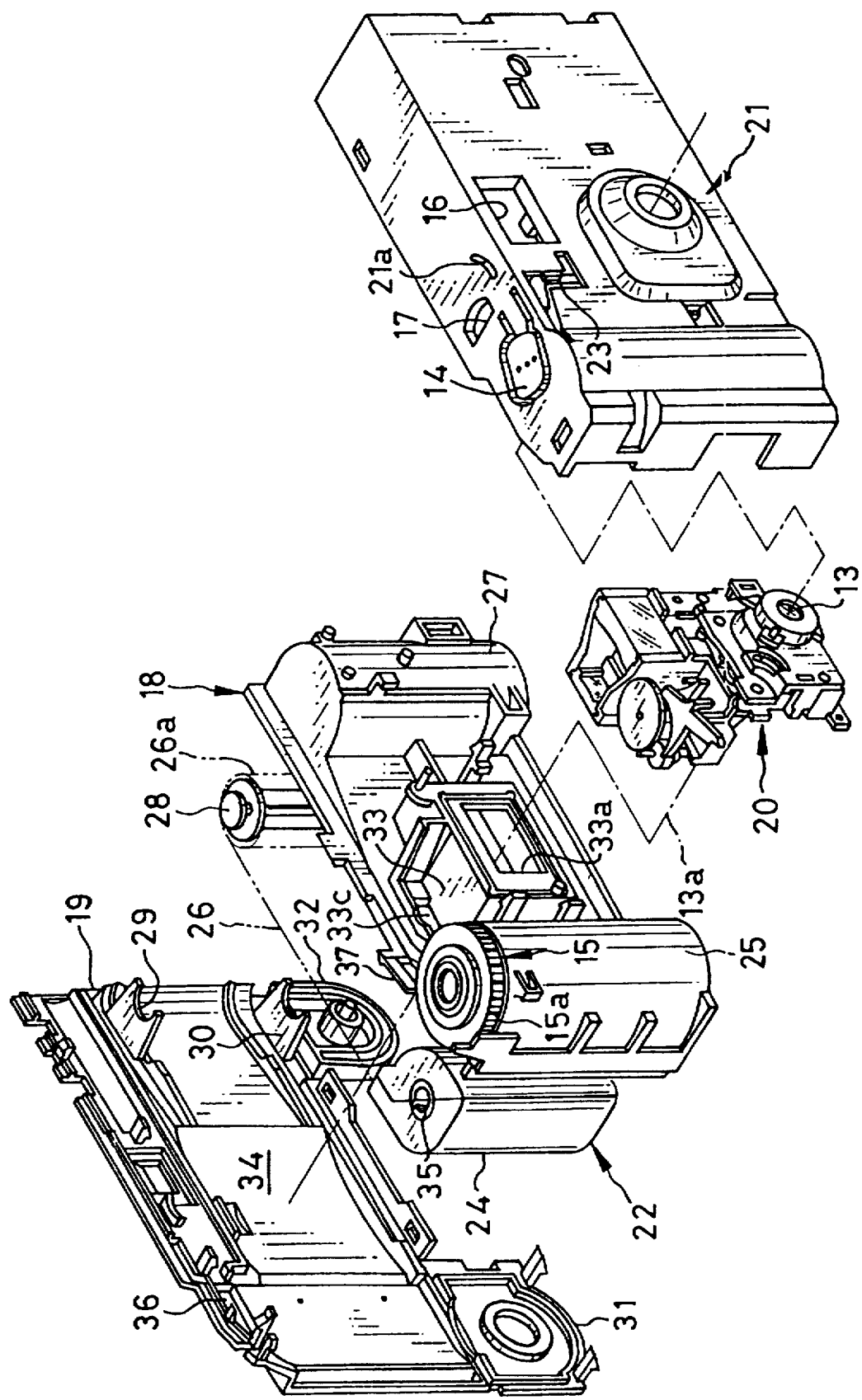
FIG. 2 is an exploded perspective view illustrating a film unit housing of the film unit of FIG. 1.

As illustrated in FIG. 2, the film unit housing 12 consists of a film containing section 18, a rear cover 19, a photo-taking unit 20 and a front cover 21.

In front of the film containing section 18, the photo-taking unit 20 is secured in a removable fashion. The photo-taking unit 20 is constructed as an integrated assembly including the taking lens 13, a shutter mechanism, a one-frame winding and shutter-charging mechanism, and other elements essential for photo-taking, as will be described later in detail. The rear cover 19 is secured to the rear of the film containing section 18 in a removable fashion. A photo film cassette 22 with a cassette shell 24 is contained between the rear cover 19 and the film containing section 18 in a light-tight fashion.

The front cover 21 is secured to the front of the photo film containing section in a removable fashion. The shutter release button 14 is formed with the front cover 21 by forming slits in the top of the front cover 21. Under the shutter release button 14 is formed a pressing rod 23, which presses a retaining member or lever 44 to actuate the shutter blade, as will be described later in detail. A tool insertion slot 21a is formed through the front cover 21 in proximity to the shutter release button 14. The tool insertion slot 21a allows insertion of a tool to rotate a shutter drive member or lever 43 to a charged position for a performance test of the shutter blade prior to shipping the film unit 10 from the factory.

In the film containing section 18, there are formed a cassette chamber 25 and a film scroll chamber 27. The cassette chamber 25 contains the cassette shell 24, while the film scroll chamber 27 contains a scroll 26a of unexposed photo film 26 as drawn from the cassette shell 24. In the present embodiment, the scroll 26a is formed while wound about a supply spool 28. The supply spool 28 is rotatably supported by two forks 29 and 30, which are formed on the rear cover 19, and contacted on upper and lower ends of the supply spool 28 to support the supply spool 28 within the scroll 26a. It is to be noted that the supply spool 28 can be eliminated while the scroll 26a is directly contained in the film scroll chamber 27. At that time, the forks 29 and 30 may be omitted.

Bottoms of the chambers 25 and 27 are open, and are closed by bottom lids 31 and 32 after the loading of the photo film cassette 22. The bottom lids 31 and 32 are formed integrally with the rear cover 19.

Between the cassette chamber 25 and the film scroll chamber 27 is located a light-shielding chamber 33. Behind the light-shielding chamber 33 is formed an exposure aperture (not shown in FIG. 2), which has a curved surface defined about an optical axis 13a of the taking lens 13, and adapted to contact with the photo film 26. On the rear cover 19 is formed a film support face 34 confronting a back surface of the photo film 26. The support face 34 is curved complementarily to the curved surface of the exposure aperture. It is possible to form the light-shielding chamber 33 with the photo-taking unit 20 instead of the film containing section 18. It is also possible to separate the light-shielding chamber 33 into two parts, one of which may be formed on the photo-taking unit 20 and the other may be formed on the film containing section 18, so that the light-shielding chamber 33 may be provided only after the photo-taking unit 20 is fitted to the film containing section 18.

In front of the light-shielding chamber 33, there is formed an opening 33a for introducing light entering though the taking lens 13 to the exposure aperture. A cut-out 33c is formed in a position higher than the exposure aperture and near to the cassette shell 24. Though the cut-out 33c, a sprocket wheel 41 of the one-frame winding and shutter-charging mechanism protrudes partially toward the photo film 26 (see FIG. 3).

The winding wheel 15 is disposed one the top of the cassette containing chamber 25 in rotatable fashion, and engaged with a spool 35 of the cassette shell 24. The winding wheel 15 partially emerges externally through an opening 36 of the rear cover 19, to permit rotating the winding wheel 15 in a counterclockwise direction to wind the photo film 26 as exposed onto the spool 35 since the unexposed film scroll 26a is contained in the film scroll chamber 27. That is, the photo film 26 is advanced frame after frame in a winding direction from the film scroll chamber 27 to the cassette chamber 25.

Around the winding wheel 15 are formed teeth 15a. An anti-reverse claw 37 is formed on the film containing section 18, and engaged with the teeth 15a. The anti-reverse claw 37 keeps the winding wheel 15 from rotating in a clockwise direction reverse to the film winding direction.

Figure 4:
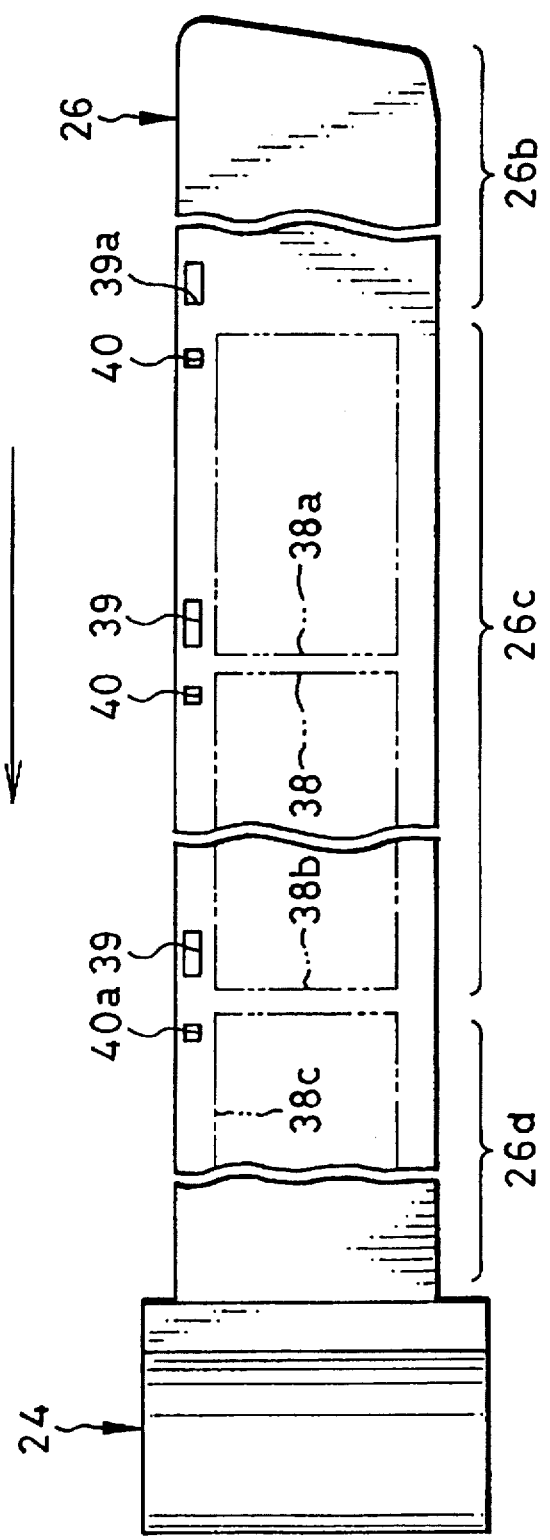
FIG. 4 is an explanatory view illustrating a photo film drawn from a cassette shell of the photo film cassette.

As shown in FIG. 4, the photo film 26 includes a leader 26b, a frame recording portion 26c effective for exposure of frames, and a trailer 26d. The trailer 26d is retained to the spool 35. Greater perforations 39 and smaller perforations 40 are formed in the photo film 26 alternately along one edge of the frame recording portion 26c. The perforations 39 and 40 are spaced at two intervals which are alternately repeated. The longer of the two interval is according a predetermined length of each frame 38. The shorter of the two intervals is according to a spacing between adjacent two of the frames 38. The center of the frame 38 is aligned with the optical axis 13a of the taking lens 13 in a proper exposure position.

In other words, one of the greater perforations 39 is formed directly beside a corner of each frame 38 nearer to the trailer 26d, whereas one of the smaller perforations 40 is formed beside an opposite corner of each frame 38 that is nearer to the leader 26b. The greater perforations 39 have the same size that is greater in the longitudinal direction of the photo film 26 than that of the smaller perforations 40, and is equal in the width direction to the smaller perforations 40.

The photo film 26 having a pair of a greater perforation 39 and a smaller perforation 40 per frame is produced for use in the film unit 10, so as to cooperate with the one-frame winding and shutter-charging mechanism as set forth below.

In the course of the perforation forming, an additional greater perforation 39a is formed in the leader 26b beside a frame 38a the nearest to the leader 26b. As being exposed at last in the film unit 10, the frame 38a will be hereinafter referred to as the last exposure frame 38a. Also an additional smaller perforation 40a is formed beside a frame 38b the nearest to the trailer 26d. As being exposed at first in the film unit 10, the frame 38b will be hereinafter referred to as the first exposure frame 38b. The trailer 26d has a length which is more than double the length of one frame, and may have a lab-space 38c which is as large as one frame 38. The lab-space 38c may be utilized for some purpose in a photo-lab or the factory.

Figure 5:
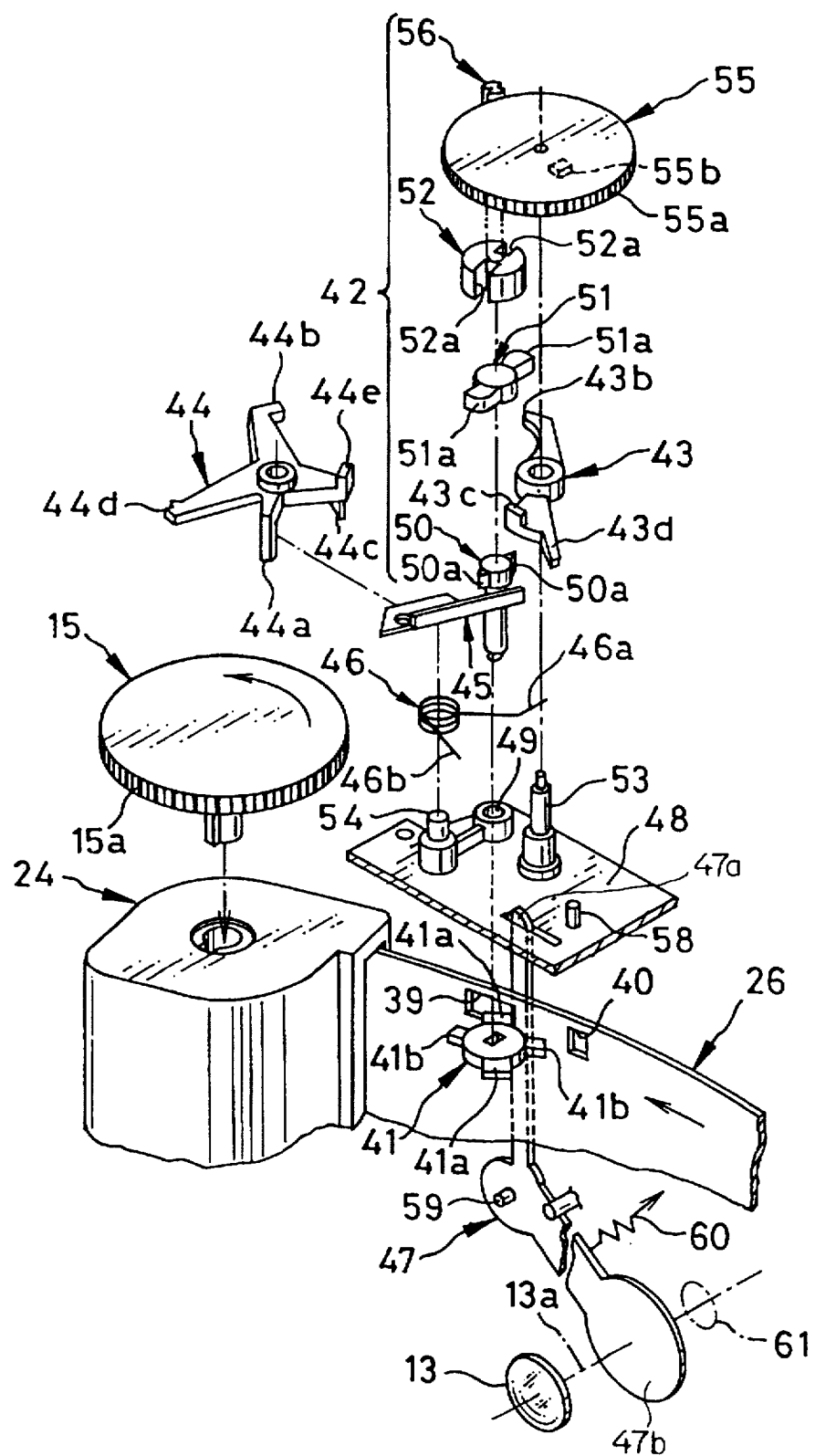
FIG. 5 is an exploded perspective view illustrating a one-frame winding and shutter-charging mechanism of the film unit, which makes use of rotation of a sprocket wheel for charging a shutter drive member.

The photo-taking unit 20 includes a frame counter mechanism in addition to the taking lens 13, the one-frame winding and shutter charging mechanism, and the shutter mechanism. As shown in FIG. 5, those components are constituted by the sprocket wheel 41, a rotary member 42, the shutter drive member 43, the retaining member 44, a plate spring 45, a coil spring 46, a shutter blade 47, and a frame counter wheel 55.

There are two shafts 53 and 54 and a bearing hole 49 formed with an upper face of a base plate 48 of the photo-taking unit 20. The shaft 53 receives the shutter drive member 43 and the counter wheel 55 in insertion. The shaft 54 receives the coil spring 46 and the retaining member 44 in insertion.

The rotary member 42 is inserted in the bearing hole 49. The rotary member 42 includes a cylinder portion 50, a shutter charge cam 51, a stopper cam portion 52, a two-toothed gear 56 as stepping member, which are formed integrally. The sprocket wheel 41 emerging through the cut-out 33c is connected to a bottom of the cylinder portion 50.

The sprocket wheel 41 has four teeth including two greater teeth 41a and two smaller teeth 41b. The two greater teeth 41a are disposed in rotational symmetry at an angle of 180 degrees about a circular peripheral face 41c. The two smaller teeth 41b are disposed in rotational symmetry about the peripheral face 41c. It is preferable that the length of the peripheral face 41c is not more than the length of one frame 38 of the photo film 26. The sprocket wheel 41 is rotated counterclockwise by the photo film 26 moving in the film winding direction, as viewed in the drawing.

With respect to the longitudinal or winding direction of the photo film 26, the greater teeth 41a have a size greater than the size of the smaller perforations 40, and slightly smaller than the size of the greater perforations 39. The greater teeth 41a are respectively engageable only with the greater perforations 39. The smaller teeth 41b have a size engageable with the smaller perforations 40. With the photo film 26 being fed or wound onto the spool 35, one of the smaller teeth 41b is disengaged from one of the smaller perforations 40, and then a succeeding one of the greater teeth 41a is engaged with a succeeding one of the greater perforations 39, to terminate one-frame winding, as will be described in detail below.

The cylinder portion 50 has two projections 50a disposed in rotation symmetry about its axis, and contacted on the plate spring 45 which operates as biasing member. When one of the smaller teeth 41b and a succeeding one of the greater teeth 41a are respectively engaged with one of the smaller perforations 40 and a succeeding one of the greater perforations 39, then the plate spring 45 is pressed and resiliently deformed by the projection 50a. After the succeeding one of the greater teeth 41a is disengaged from the succeeding one of the greater perforations 39, the projection 50a is in turn pressed by the plate spring 45, to rotate the sprocket wheel 41 in the driven or counterclockwise direction, until a succeeding one of the smaller teeth 41b is engaged with a succeeding one of the smaller perforations 40.

Figure 6:
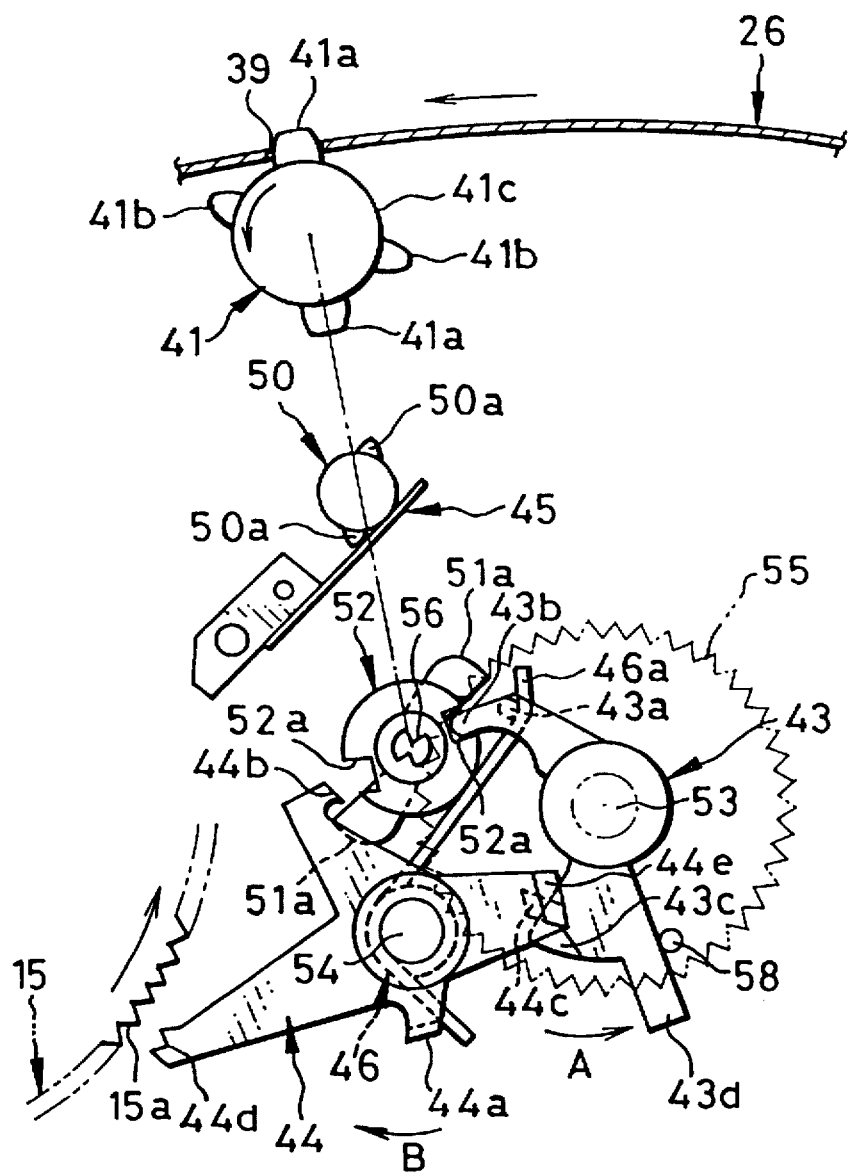
FIG. 6 is an explanatory plan view illustrating the one-frame winding and shutter-charging mechanism in a released position of the shutter drive member.

A distal end 46a of the coil spring 46 is engaged with a receiving portion 43a of the shutter drive member 43, and biases the shutter drive member 43 about the shaft 53 counterclockwise toward its initial or released position, as indicated by an arrow A in FIG. 6. Another distal end 46b of the coil spring 46 is engaged with a receiving portion 44a of the retaining member 44, and biases the retaining member 44 about the shaft 54 clockwise toward a lock position, as indicated by an arrow B in FIG. 6. The charge cam 51 has two cam portions 51a disposed in rotational symmetry at an angle of 180 degrees. The shutter drive member 43 has a claw 43b, which is located in a rotational orbit of the cam portions 51a, such that, while the sprocket wheel 41 makes half a rotation, one of the cam portions 51a causes the shutter drive member 43 to rotate clockwise toward a charged position against the bias of the coil spring 46.

When the photo film 26 is fed as long as one frame, the rotary member 42 makes half a rotation in the counterclockwise direction. Two grooves 52a are formed in the stopper cam portion 52 and disposed in rotational symmetry thereabout. Upon the half rotation of the rotary member 42, a claw 44b of the retaining member 44 is received in one of the grooves 52a, to stop rotation of the sprocket wheel 41. The retaining member 44 now has the top position where the retaining member 44 stops the photo film 26 from being wound. In the course of rotation of the retaining member 44 toward the lock position, a bottom ridge 44c of the retaining member 44 moves into a rotational orbit of a top ridge 43c of the shutter drive member 43 to maintain the shutter drive member 43 in the charged position. When the retaining member 44 rotates to the lock position, a stop claw 44d is engaged with the teeth 15a of the winding wheel 15, to hinder the photo film 26 from being wound.

Should the shutter drive member 43 be rotated toward the charged position against the coil spring 46 during disengagement of the teeth 41a and 41b from the perforations 39 and 40, it is likely that even the bias of the plate spring 45 fails to rotate the sprocket wheel 41 in the counterclockwise direction. Accordingly the cam portions 51a are so formed as to rotate the shutter drive member 43 toward the charged position during mesh of the teeth 41a and 41b with the perforations 39 and 40.

Figure 7:
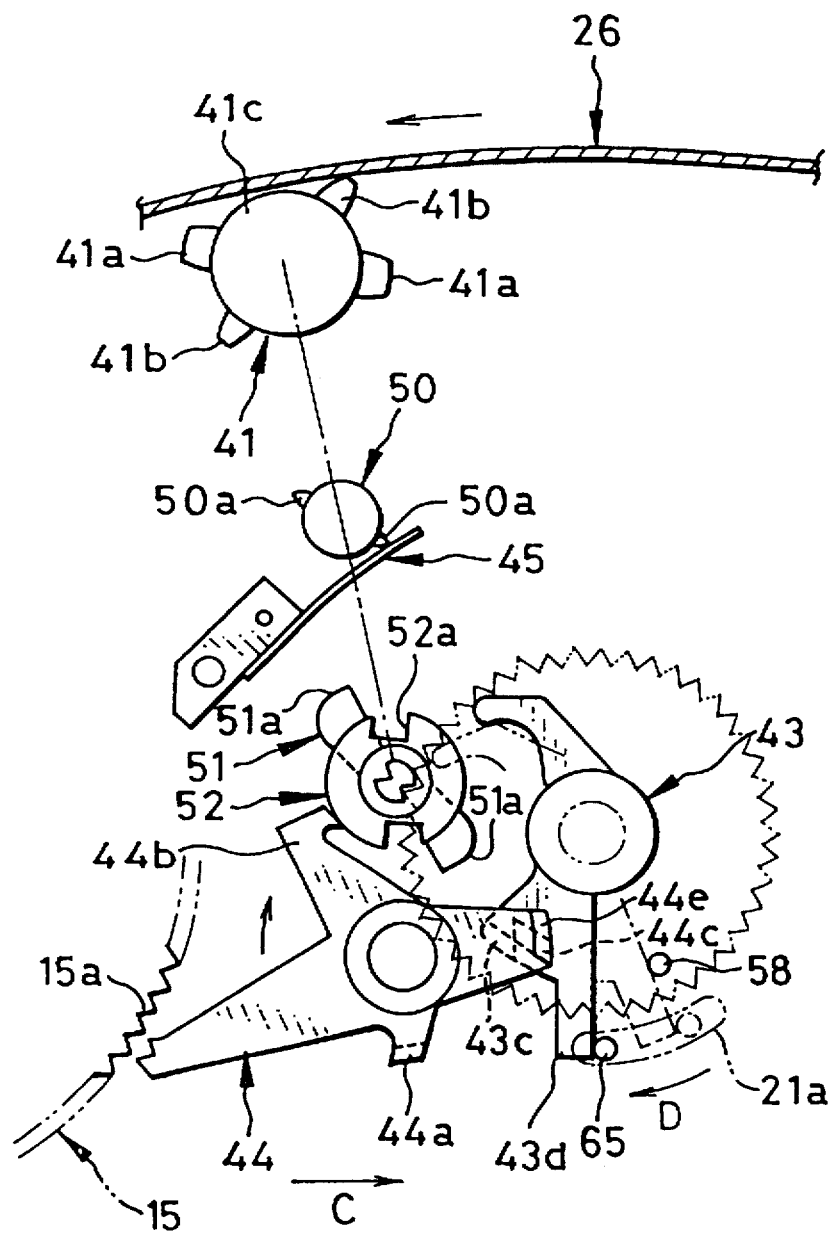
FIG. 7 is an explanatory plan view similar to FIG. 6 but illustrating a position charged by a tool for a shutter performance test in the factory.

When the shutter release button 14 is depressed, the pressing rod 23 pushes the receiving portion 44a of the retaining member 44 in a direction shown by an arrow C in FIG. 7, to rotate the retaining member 44 counterclockwise to unlock the film winding wheel 15. Then the bottom ridge 44c is moved away from the rotational orbit of the top ridge 43c of the shutter drive member 43. The shutter drive member 43 is rotated by the bias of the coil spring 46 counterclockwise about the shaft 53. This is until a striking arm 43d comes in contact with a stopper 58. The shutter drive member 43 now has a released position. During this rotation, the striking arm 43d strikes an arm 47a of the shutter blade 47.

In front of the base plate 48, there is disposed a shaft 59 in parallel with the optical axis 13a. The shutter blade 47 is supported on the shaft 59 in swinging fashion. The shutter blade 47, when driven by the shutter drive member 43, makes a reciprocating movement from a closing position to open a shutter opening 61 for a given time. In the closing position, a blade portion 47b of the shutter blade 47 closes the shutter opening 61 located on the optical axis 13a under the bias of a tension spring 60.

When the shutter drive member 43 rotates to the released position, the top ridge 43c comes into the rotational orbit of the bottom ridge 44c of the retaining member 44, and retains the retaining member 44 in the unlocked position. When the retaining member 44 is in the unlocked position, the stop claw 44d is retracted from the teeth 15a, and the claw 44b is retracted from the grooves 52a. The photo film 26 is allowed to be wound further.

The two-toothed gear 56 is engaged with a plurality of teeth 55a arranged about the counter wheel 55. When the sprocket wheel 41 makes half a rotation, one tooth of the two-toothed gear 56 causes the counter wheel 55 to rotate clockwise as much as one step. A top face of the counter wheel 55 has a series of numbers, arranged circularly as frame number indication in association with a rotational pitch. The series of the numbers is in an order to indicate the remaining number of unexposed frames, which is observable through the indicator window 17.

As described above, the photo film 26 is previously drawn from the cassette shell 24 and wound into the scroll 26a. According to the present invention, the photo film 26 is drawn out so far as the first exposure frame 38b, i.e. the most trailing frame in the drawing-out direction, passes an exposure position behind the exposure aperture 33b of the light-shielding chamber 33 by a length equal to or more than the length of one frame. That is, the photo film 26 should not be fully drawn from the cassette shell 24, but until the trailer 26d having no perforation is disposed behind the exposure aperture 33b. According to the embodiment shown in FIG. 3, the first exposure frame 38b is initially set about one and half the length of one frame farther from the exposure position, as implied by the lab space 38c, which is equal in size to one frame, overlapping with the exposure aperture 33b.

On the other hand, the sprocket wheel 41 is initially set in the position as shown in FIG. 7, where the teeth 41a and 41b of the sprocket wheel 41 do not hinder the photo film 26 from moving upon a preliminary winding, that is, where the photo film 26 is in contact with the peripheral face 41c of the sprocket wheel 41 in a slidable fashion. The preliminary winding is made to charge the shutter drive member 43 as well as to place the first exposure frame 38b in the exposure position prior to the first or initial exposure, since the shutter drive member 43 is initially set in the released position to avoid an unexpected exposure caused by an accidental depression of the shutter release button 14. As the sprocket wheel 41 is initially set in the position shown in FIG. 7, the photo film 26 slides smoothly on the peripheral face 41c of the sprocket wheel 41 during the preliminary winding, without being scratched or damaged by the sprocket wheel 41.

When the sprocket wheel 41 is in the initial position shown in FIG. 7, the cam 51a does not rotate the shutter drive member 43 to the charged position, so that the shutter drive member 43 is in the released position as is indicated by phantom lines in FIG. 7, where the shutter drive member 43 holds the retaining member 44 in the unlocked position.

To test the performance of the shutter mechanism of the assembled film unit 10, a tool 65 is inserted through the tool insertion slot 21a in this position of the mechanisms, to engage its tip with the striking arm 43d and pushing the shutter drive member 43 into the charged position, as is indicated by an arrow D in FIG. 7. In the charged position, the top ridge 43c retracts from the rotational orbit of the bottom ridge 44c to cause the retaining member 44 to rotate toward the unlocked position. But then the stopper cam portion 52 is not oriented to receive the claw 44b in its grooves 52a, so that the claw 44b strikes against the periphery of the stopper cam portion 52 to stop the retaining member 44 away from the lock position. The slight rotation of the retaining member 44 lets the bottom ridge 44c into the rotational orbit of the top ridge 43c to hold the shutter drive member 43 in the charged position. So the shutter drive member 43 will not be released upon removal of the tool 65. Then, the shutter performance test may be executed by depressing the shutter release button 14 in a manner as set forth below.

On the other hand, after making the exposure of the last exposure frame 38a, it is necessary to wind the entire length of the photo film 26 into the cassette shell 24. There is formed stopper projection 55b under the counter wheel 55 as a disabling device. In the course of the film winding after the exposure of all available frames, a top projection 44e of the retaining member 44 is brought into engagement with the stopper projection 55b. Then the claw 44b of the retaining member 44 is moved out of the groove 52a, and the stop claw 44d is moved away from the teeth 15a. The bottom ridge 44c comes into the rotational orbit of the top ridge 43c of the shutter drive member 43, so that the retainer member 44 is maintained in a disabled position, in which the retainer member 44 allows inclusion of the photo film, and the shutter drive member 43 is kept in the charged position.

Now the operation of the above construction will be described.

In the factory, the photo-taking unit 20 is first assembled. Then, the performances of the shutter mechanism as well as the one-frame winding and shutter charging mechanism are inspected before the photo-taking unit 20 is assembled into the film unit housing 12. At that time, the shutter drive member 43 is set in the released position. After passing the inspection, the photo-taking unit 20 is attached to the film containing section 18, and the sprocket wheel 41 is set in the initial position shown in FIG. 7.

Figure 8:
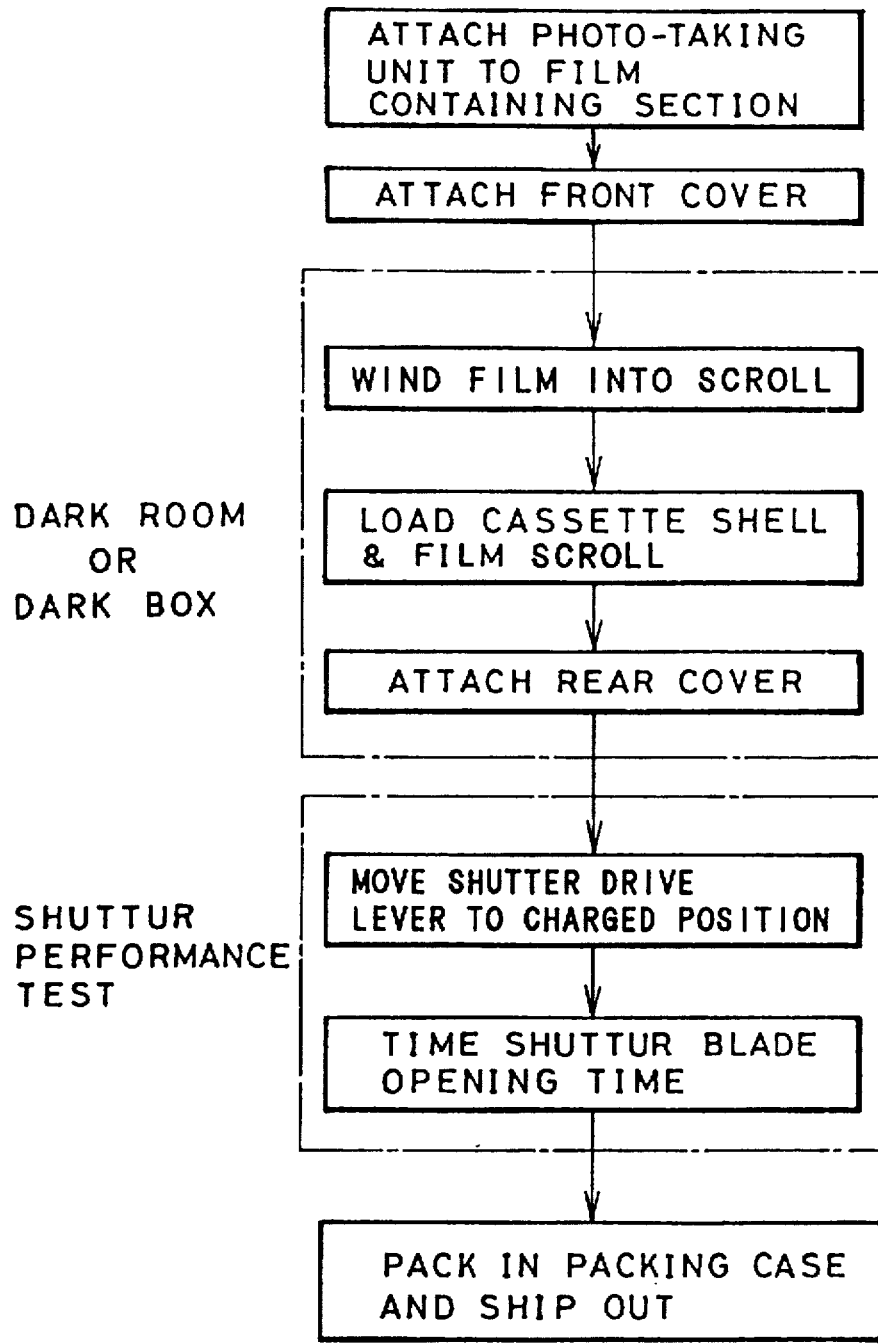
FIG. 8 is a flow chart illustrating an assembly process of the film unit.

FIG. 8 shows a flow chart of the film unit assembly. After the front cover 21 is attached to the film containing section 18 to cover the front of the photo-taking unit 20, the photo film cassette 22 is loaded with its photo film 26 drawn from the cassette shell 24 and wound into the scroll 26a. This process is done in a dark room. In automatic loading, the leader 26b is secured to the supply spool 28, and the supply spool 28 is rotated through a fork member, to wind the photo film 26 tightly thereon. To detect the drawn length of the photo film 26 from the cassette shell 24, a sensor, e.g., a rotary encoder rotating along with the photo film 26 or the supply spool 28 is disposed in proximity to the photo film 26. The drawn length of the photo film 26 may be measured by counting the perforations 39 and 40. It is possible to omit the supply spool 28 and form the scroll 26a by rotating a fork member which directly hold the leader 26b of the photo film 26.

As described above, the photo film 26 is drawn from the cassette shell 24 so far as the first exposure frame 38a, i.e. the most trailing frame in the drawing-out direction, comes out to a position which is farther than the exposure position behind the exposure aperture 33b by a length equal to or more than the length of one frame, as is shown in FIG. 4. Since the photo film 26 should not be fully drawn from the cassette shell 24, it save the time for drawing and scrolling the photo film 26.

After loading the cassette shell 24 and the scroll 26a of the photo film 26 in this state into the cassette chamber 25 and the film scroll chamber 27, respectively, the fork member is removed from the supply spool 28. Then, the rear cover 19 is attached to the film containing section 18 to contain the photo film cassette 22 light-tightly.

The film unit 10 loaded with the photo film cassette 22 is then subjected to the shutter performance test. First, the tool 65 is inserted through the tool insertion slot 21a, to engage its tip with the striking arm 43d and pushing the shutter drive member 43 into the charged position. In the charged position, the top ridge 43c retracts from the rotational orbit of the bottom ridge 44c to cause the retaining member 44 to rotate toward the lock position. But then the stopper cam portion 52 is not oriented to receive the claw 44b in its grooves 52a, so that the claw 44b strikes against the periphery of the stopper cam portion 52 to stop the retaining member 44 away from the lock position. The slight rotation of the retaining member 44 lets the bottom ridge 44c into the rotational orbit of the top ridge 43c to hold the shutter drive member 43 in the charged position. So the shutter drive member 43 will not be released upon removal of the tool 65.

A shutter tester may be constituted of a light projecting portion for projecting a spot beam of infrared light or a Laser beam toward the taking lens 13 along the optical axis 13a, a photo-sensor for receiving the light beam projected toward the taking lens 13 and reflected from the shutter blade 47, and a measuring section. The measuring section measures the time duration when the photo-sensor does not receive the reflected light, that is, the time duration for which the shutter blade 47 opens the shutter opening 61 in response to a depression of the shutter release button 14. The shutter performance test should preferably be executed in a dark, but may be executed under the light.

The shutter release button 14 is depressed while the film unit 10 is fixed in a predetermined posture. Then, the pressing rod 23 disposed below the shutter release button 14 presses the receiving portion 44a in the direction C in FIG. 7. In result, the retaining member 44 rotates counterclockwise against the force of the coil spring 46. Then the bottom ridge 44c is moved away from the rotational orbit of the top ridge 43c of the shutter drive member 43, so that the shutter drive member 43 rotates rapidly under the force of the coil spring 46 until the released position where the striking arm 43d is stopped by the stopper 58. During this rotation, the striking arm 43d strikes the arm 47a of the shutter blade 47 to cause it to make the reciprocating pivotal movement about the shaft 59. Concurrently, the measuring section of the shutter tester measures the time of interruption of the reflected light to check whether the shutter blade 47 moves properly.

It is to be noted that the light beam will not adversely affect the quality of the photo film 26 or the images to be photographed, because the infrared light has no effect on the photo film 26. Even the Laser beam is able to form a spot image out of the frame recording portion 26c. When using the Laser beam for the shutter performance test, it is preferable to set the lab space 38c away from the optical axis 13a of the taking lens 13 in the initial position of the photo film 26 as in the embodiment shown in FIG. 3, in order to keep the lab space 38c unexposed.

After the shutter performance test, the qualified film units 10 are packed in the packing case 11 and shipped for sale. The tool insertion slot 21a is covered by the packing case 11.

Figure 3:
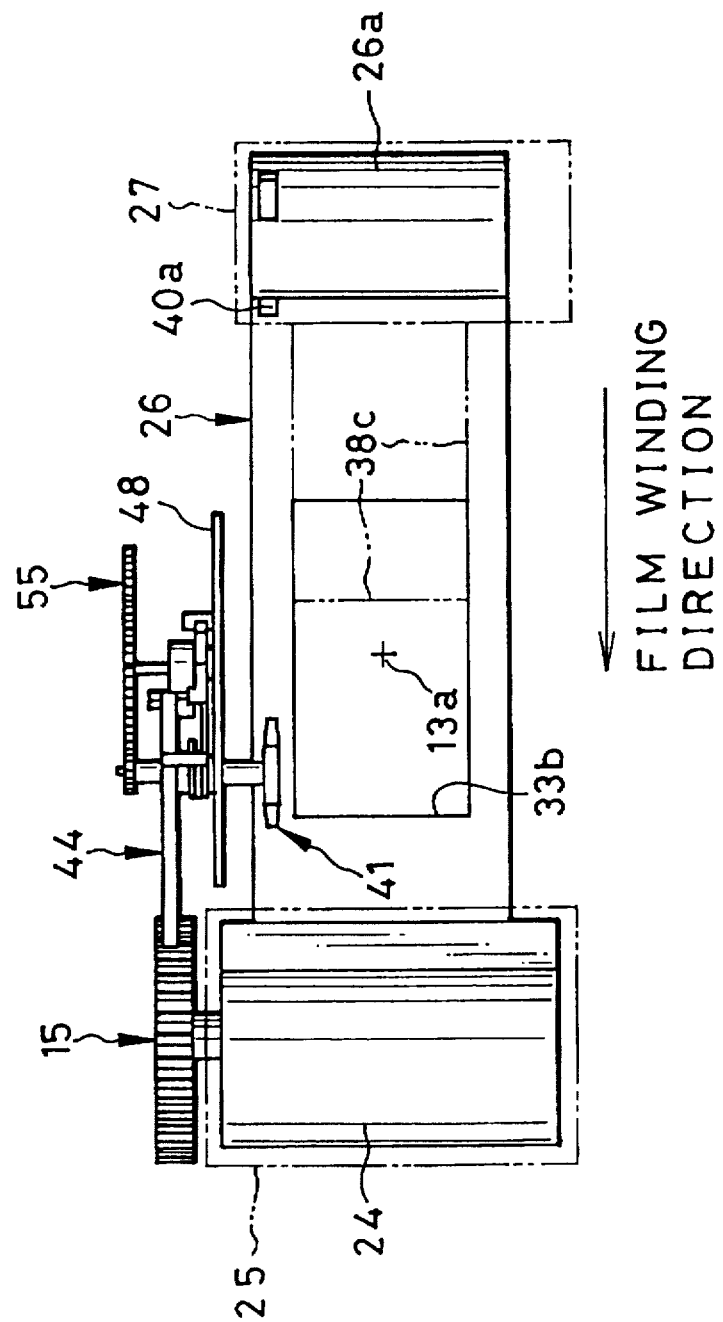
FIG. 3 is an explanatory view illustrating an initial position of a photo film cassette preloaded in the film unit housing.

As described above, the photo film 26 in the film unit 10 is initially set in the position as shown in FIG. 3 where the trailer 26d is disposed behind the exposure aperture 33b with the lab space 38c overlapping with the exposure aperture 33b. On the other hand, the sprocket wheel 41 is set in the position shown in FIG. 7 where the teeth 41a and 41b do not interfere the movement of the photo film 26. When the photographer makes the preliminary winding in this initial condition, because there is no perforation in the trailer 26d, the photo film 26 slides on the peripheral face 41c of the sprocket wheel 41 until the trailer 26d including the lab space 38c has passed the exposure aperture 33b in the film winding direction.

Figure 9:
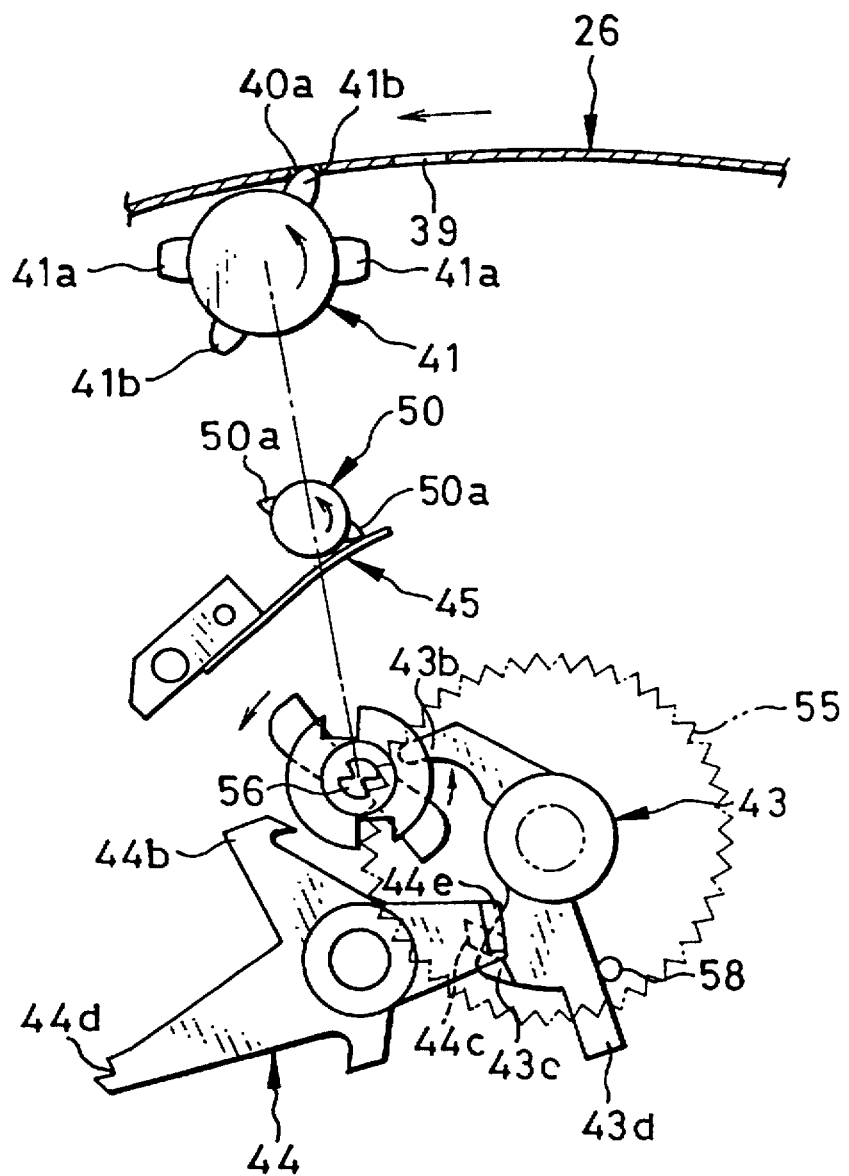
FIG. 9 is an explanatory plan view similar to FIG. 6 but illustrating a charging position on the way of one-frame winding and shutter-charging.

First when the additional smaller perforation 40a reaches the sprocket wheel 41, one of the smaller teeth 41b is engaged in the additional smaller perforation 40a under the force of the plate spring 45, as shown in FIG. 9.

Figure 10:
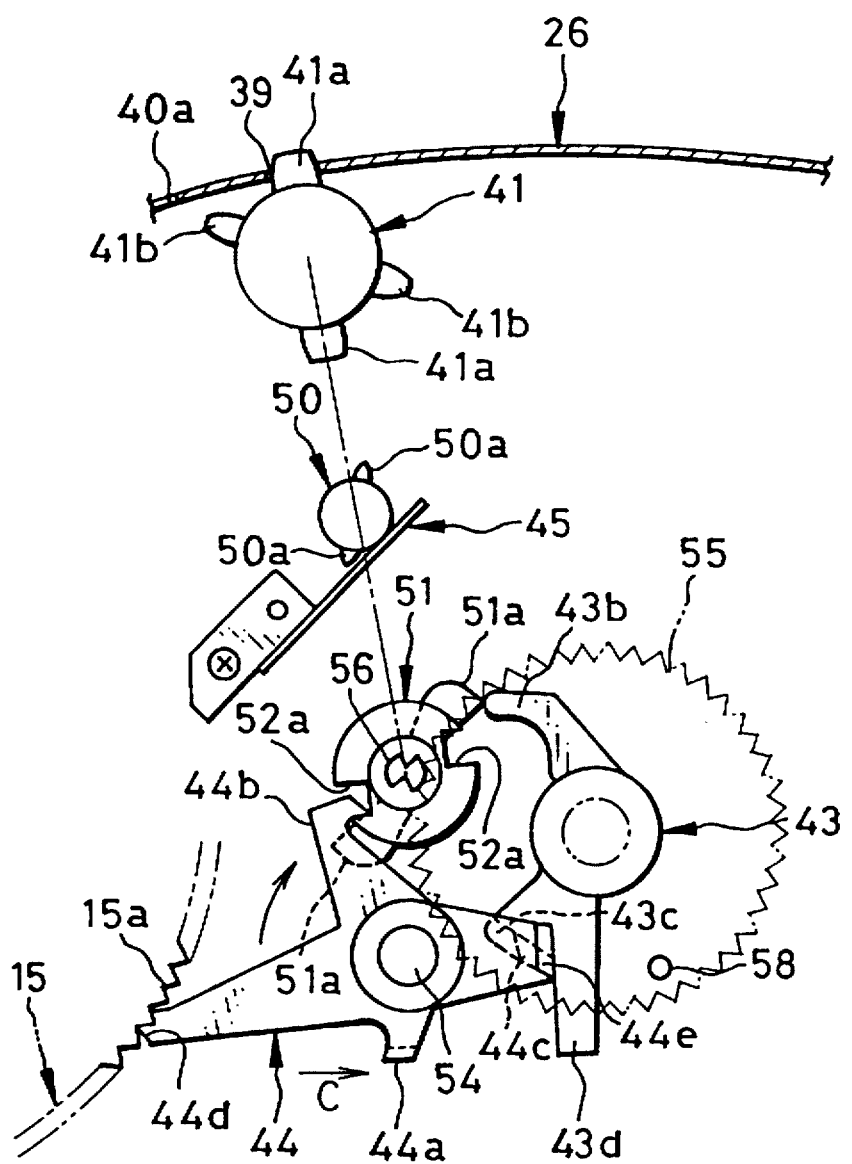
FIG. 10 is an explanatory plan view similar to FIG. 9 but illustrating a charged position where the photo film is locked.

Further winding operation brings the succeeding one of the greater teeth 41a into engagement with the greater perforation 39 formed to designate the first exposure frame 38b, as is shown in FIG. 10. Simultaneously, the sprocket wheel 41 and thus the rotary member 42 rotate to the position where the claw 44b of the retaining member 44 is caught in the groove 52a of the stopper cam portion 52, so that the retaining member 44 is set in the unlocked position where the stop claw 44d is in mesh with the teeth 15a of the film winding wheel 15. Thus, the first exposure frame 38b is positioned behind the exposure aperture 33b. During the rotation of the retaining member 44 to the locked position, the cam 51a rotates the shutter drive member 43 to the charged position, and the bottom ridge 44c moves into the rotational orbit of the top ridge 43c, so that the retaining member 44 holds the shutter drive member 43 in the charged position.

When the shutter release button 14 is depressed, the retaining member 44 is moved in the direction C to unlock the film winding wheel 15 and also release the shutter drive member 43 from the charged position. After making an exposure in this way, the top ridge 43c lies in the rotational orbit of the bottom ridge 44c to hold the retaining member 44 in the unlock position. Therefore, the film is allowed to be wound until the next frame is positioned behind the exposure aperture 33b.

Exposure are taken by repeating similar operations. After exposing the last exposure frame 38a, the mechanisms of the film unit 10 have the position of FIG. 6 again. Further winding of the photo film 26 cause the shutter drive member 43 to rotate to the charged position. Then, the shutter drive member 43 enables the retaining member 44 to rotate from the unlocked position toward the locked position under the force of the coil spring 46 when the sprocket wheel 41 has made half a rotation to oppose the groove 52a to the claw 44b.

During this rotation, the bottom ridge 44c comes into the rotational orbit of the top ridge 43c, so that the retaining member 44 maintains the shutter drive member 43 in the charged position. Also, the two-toothed gear 56 rotates with the film winding, to cause the counter wheel 55 to rotate by one step, to indicate "0" in the indicator window 17. In this position, the stopper projection 55b comes into the rotational orbit of the top projection 44e of the retaining member 44. In result, the retaining member 44 is held in a film wind-up position, where the photo film 26 is allowed to be wound up into the cassette shell 24 without stop.

Specifically, in the film wind-up position of the retaining member 44, the claw 44b is set away from the grooves 52a to make the sprocket wheel 41 free, and the stop claw 44d is moved away from the teeth 15a to allow winding the photo film 26, while the bottom ridge 44c lies in the rotational orbit of the top ridge 43c to hold the shutter drive member 43 in the charged position. Therefore, even through the additional greater perforation 39a next to the last exposure frame 38a comes to the sprocket wheel 41, the winding wheel 15 is not stopped. No exposure will be taken on the leader 26b.

Then the leader 26b, not having the perforations 39 and 40, is moved past the sprocket wheel 41. Since the greater teeth 41a have been disengaged from the greater perforations 39, and only one of the smaller teeth 41b is gently in contact with the photo film 26, the photo film 26 is allowed to slide on the smaller tooth 41b and the peripheral face 41c to be wound entirely into the cassette shell 24.

Even if the shutter release button 14 should be depressed during the film wind-up operation after the final exposure, the retainer member 44 would be stopped by the stopper projection 55b from moving toward the releasing position, so that the shutter drive member 43 could not be released.

The film unit 10 after completing exposures is forwarded to a photo-lab. In the photo-lab, the bottom lid 31 of the rear cover 19 is opened to remove the cassette shell 24. The photo film 26 as exposed is subjected to development and printing in widely used techniques. After this, the photo-prints are provided to the photographer with the developed photo film returned. The film unit 10 as emptied is withdrawn collectively and recycled. It is to be noted that in FIGS. 6, 7, 9 and 10, the sprocket wheel 41 and the cylinder portion 50 are shown in displacement along the one-dot-dash lines, for the sake of clarity. Also the coil spring 46 is omitted from FIGS. 7, 9 and 10 for the sake of clarity.

Although the tool insertion slot 21a for the tool 65 to charge the shutter drive member 43 is formed through the top of the front cover 21 in the above embodiment, it is possible to dispose such a slot in a front or rear portion of the film unit housing 12.

In the above embodiment, the one-frame winding and shutter charging mechanism of the film unit 10 makes use of rotation of the sprocket wheel 41 for shutter-charging, which is engaged with the photo film 26 so as to be rotated by movement of the photo film 26. The present invention is also applicable to other types film units containing the same type photo film cassette as above.

Figures 11A, 11B:
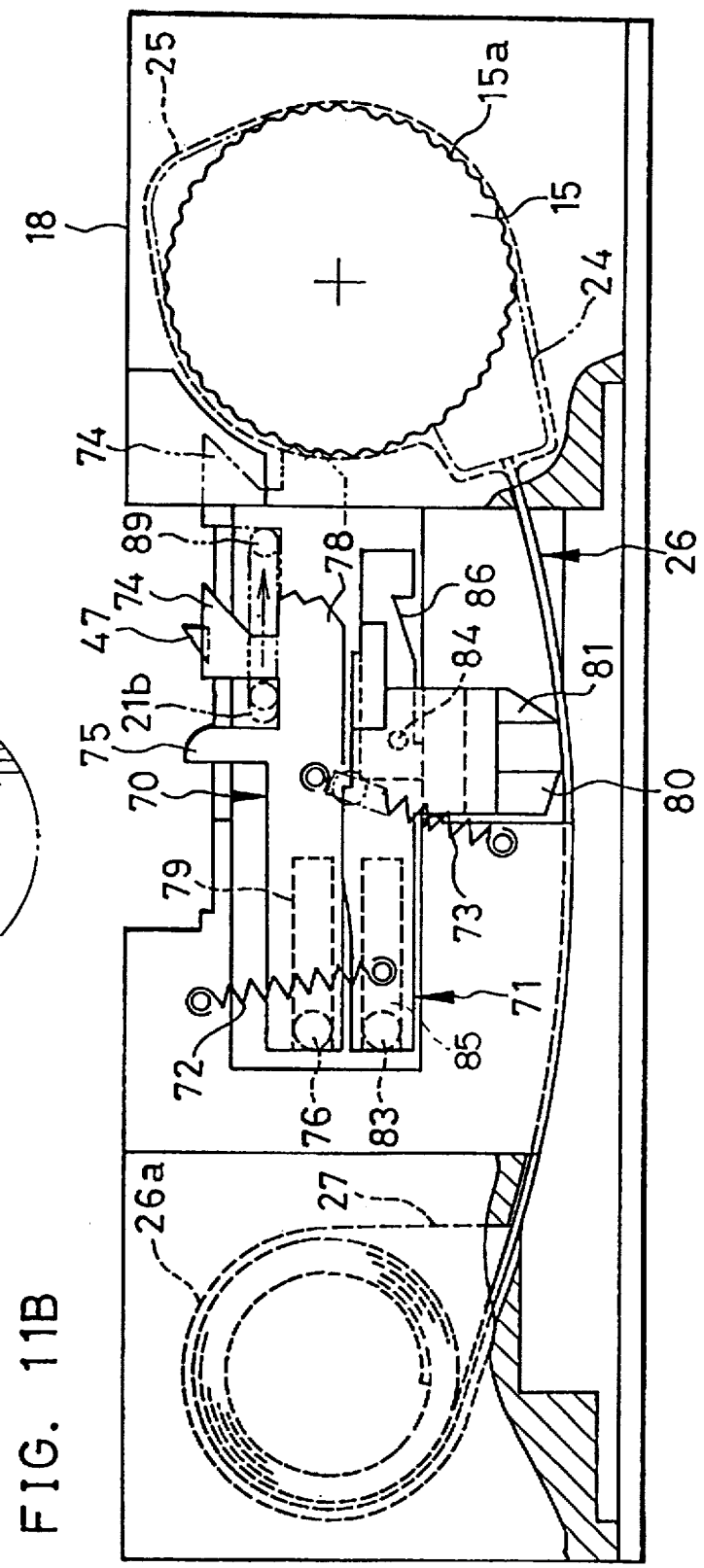
FIG. 11 is an explanatory plan view illustrating a film unit with a one-frame winding and shutter-charging mechanism where a retaining member moves linearly along with the photo film to charge a shutter drive member.
Figure 12A:
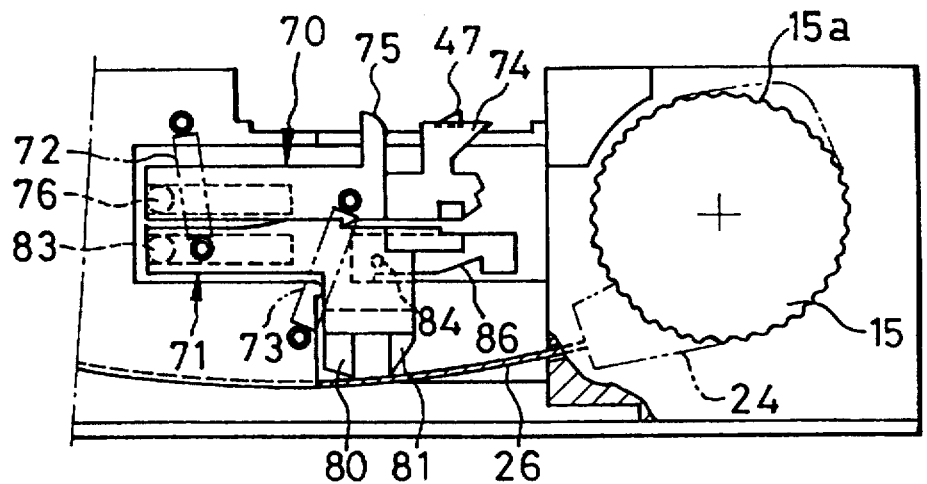
Figure 12B:
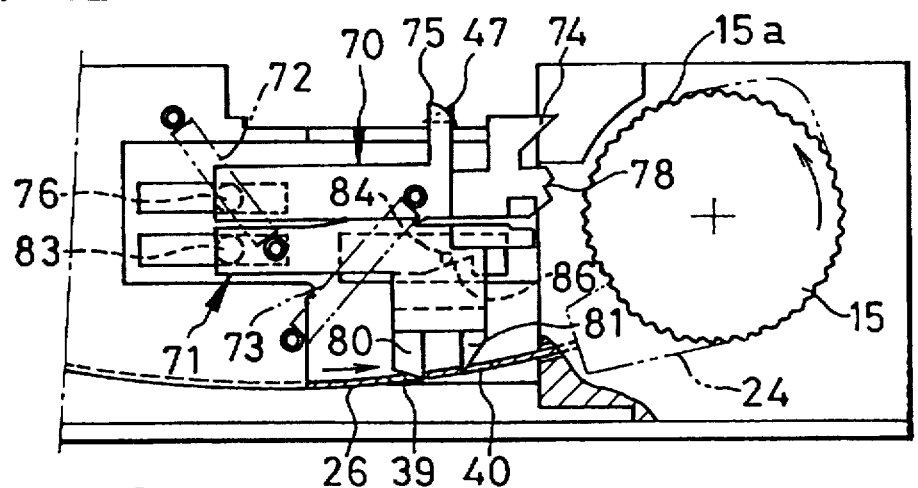
Figure 12C:
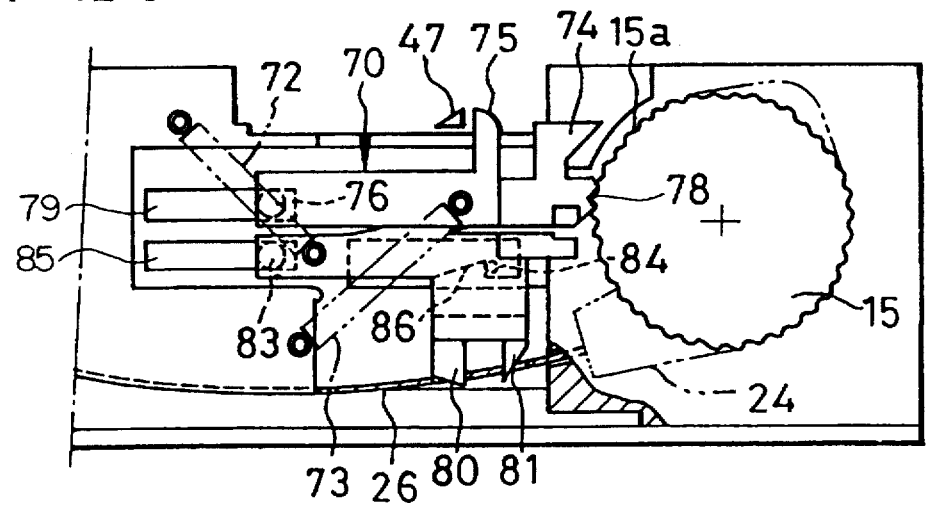
Figure 12D:
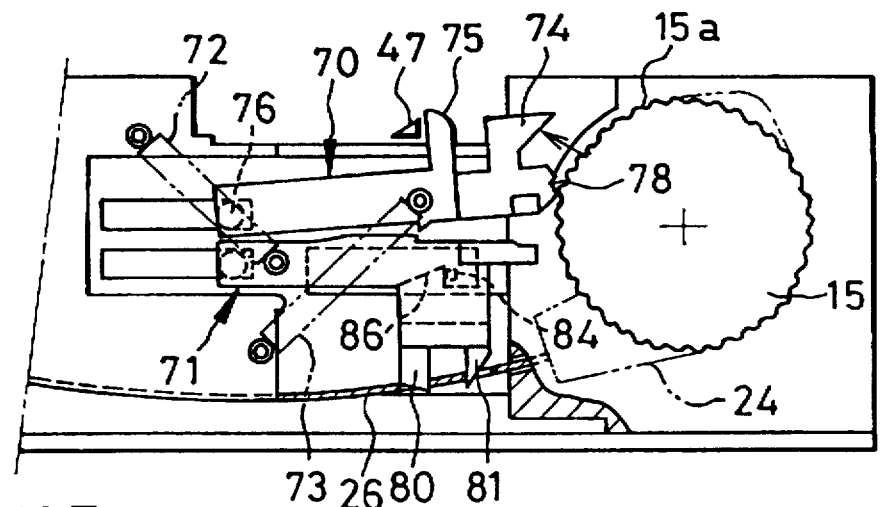
Figure 12E:
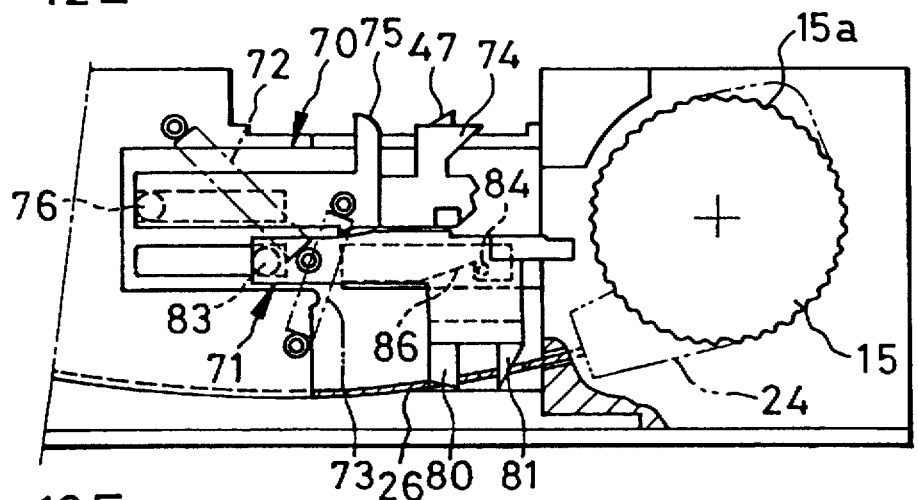
Figure 12F:
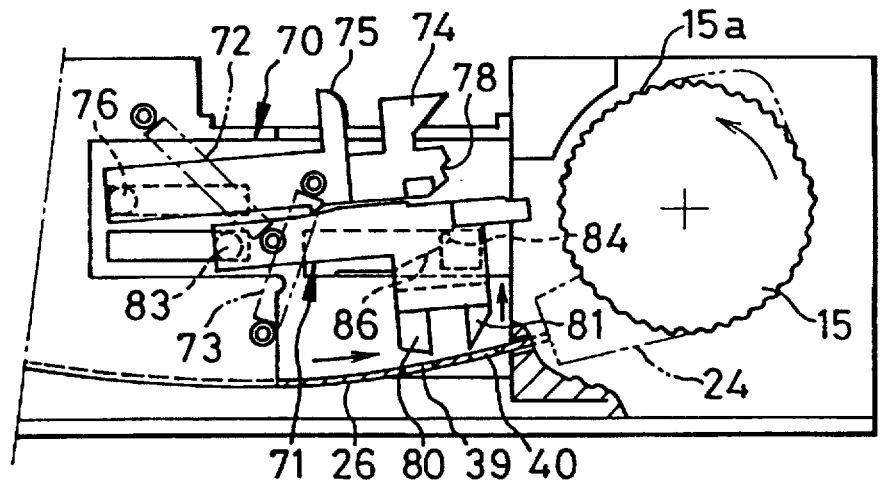
Figure 13:
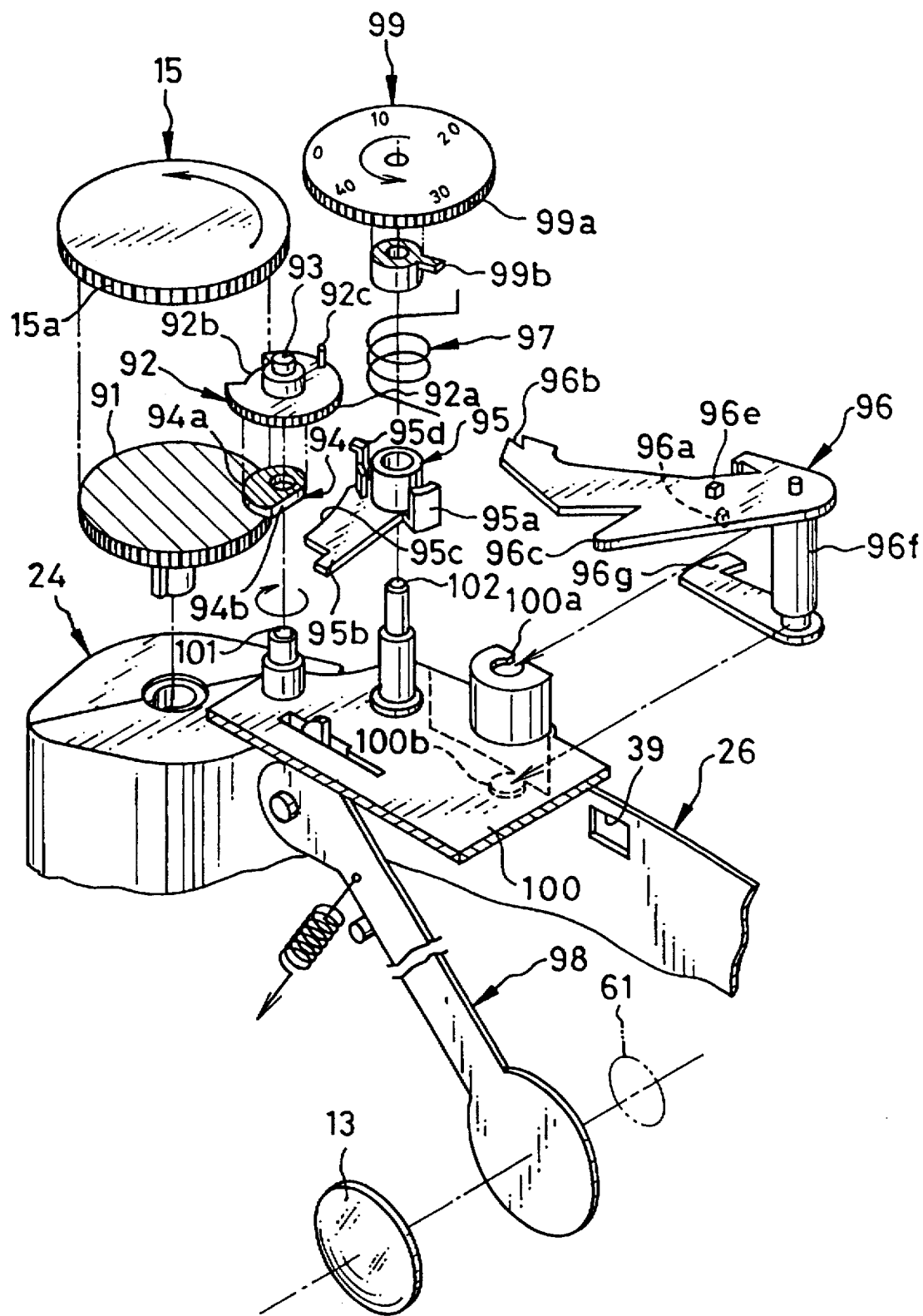
FIG. 13 is an exploded perspective view illustrating another embodiment of one-frame winding and shutter-charging mechanism which makes direct use of rotation of a film winding wheel for charging a shutter drive member.

FIGS. 11 to 13 shows an embodiment of one-frame winding and shutter-charging mechanism for a film unit, which has a pair of hooks to be engaged in a pair of greater and smaller perforations 39 and 40, so that the mechanism moves linearly along with the photo film 26.

The one-frame winding and shutter-charging mechanism is constituted of a shutter drive member or lever 70, a retaining member or lever 71, and springs 72 and 73. The shutter drive member 70 is formed as an integral part with a releasing arm 74, a striking arm 75, a sliding pin 76, an engaging claw 77, and a winding-lock claw 78. The shutter drive member 70 is able to move linearly between a release end position and a charged position with its sliding pin 76 guided along a linear groove 79.

The retaining member 71 is formed as an integral part having a pair of hooks 80 and 81 which are arranged to be engageable in the closer two perforations 39 and 40, and an engaging shoulder 82 which is engaged with the engaging claw 77 of the shutter drive member 70. The retaining member 71 also has a sliding pin 83 and a cam pin 84, such that the retaining member 71 is movable linearly between a winding-lock position and an unlocked position with its sliding pin 83 guided along a linear groove 85. The spring 72 urges the shutter drive member 70 toward the release end position, while the spring 73 urges the retaining member 71 toward the unlocked position. These springs 72 and 73 also urge the shutter drive member 70 and the retaining member 71 toward each other.

The tips of the hooks 80 and 81 are disposed inside of the hooks 80 and 81. That is, the free ends of the hooks 80 and 81 are tapered to be inclined toward each other. The hooks 80 and 81 are sized to be engageable in the greater and smaller perforations 39 and 40, respectively.

When a film winding wheel 15 is rotated in a film winding direction from the initial position shown in FIG. 12A, the photo film 26 is moved from a film scroll chamber 27 to a cassette chamber 25. Then, the photo film 26 slides on the hooks 80 and 81 until the perforations 39 and 40 reach the position facing the hooks 80 and 81, to be caught on the hooks 80 and 81. In the first stage, the engagement between the hooks 80 and 81, and the perforations 39 and 40 is slight, as is shown in FIG. 12B, because the cam pin 84 is in contact with a cam surface of a cam 86 which curves substantially parallel to the photo film 26.

Once the hooks 80 and 81 are engaged with the perforations 39 and 40, the retaining member 71 moves along with the photo film 26, while being guided along the cam 86. Due to the engagement between the engaging claw 77 and the engaging shoulder 82 of the retaining member 71, the shutter drive member 71 moves with the retaining member 71. When the cam pin 84 rides over a peak of the cam 86, the retaining member 71 rotates about the sliding pin 83 slightly in a clockwise direction, so that the hooks 80 and 81 are inserted deeper into the perforations 39 and 40. At the same time, the winding-lock claw 78 of the shutter drive member 70 comes into mesh with teeth 15a of the film winding wheel 15, to stop the film winding wheel 15 from winding, as shown in FIG. 12C.

In this stage, the cam pin 84 is hooked by the cam 86, so that the retaining member 71 is held in the winding-lock position, and thus the shutter drive member 70 is held in a charged position.

Upon depression of a not-shown shutter release button, the releasing arm 74 is pushed in a counterclockwise direction as shown in FIG. 12D through a not-shown pressing rod. In result, the engaging claw 77 is moved off the engaging shoulder 82 so that the shutter drive member 70 moves rapidly toward the release end position under the force of the spring 73, as shown in FIG. 12E. On the way of this releasing movement of the shutter drive member 70, the striking arm 75 strikes a shutter blade 47 to make an exposure, and the winding-lock claw 78 is disengaged from the teeth 15a.

After finishing releasing, the photo film 26 is wound up again in response to rotating the film winding wheel 15. Because of the inclined end of the hook 80 being pushed by a trailing margin of the perforation 39 of the photo film 26 in motion, the retaining member 71 is rotated about the sliding pin 83 slightly in a counterclockwise direction. As a result, the cam pin 84 rides over the peak of the cam 86 in the opposite direction, so that the retaining member 71 is moved back to the initial position under the force of the spring 72.

In the film unit having the just described one-frame winding and shutter-charging mechanism, the photo film 26 and a cassette shell 24 are loaded in the same way as the above embodiment. That is, the photo film 26 is drawn from the cassette shell 24 until the first exposure frame 38b moves out to a position which is one-frame length or more farther than the exposure position behind an exposure aperture, from the cassette shell 24.

To test the performance of the one-frame winding and shutter-charging mechanism shown in FIG. 11, a tool 89 is inserted through a tool insertion slot 21b of a front cover 21, as indicated by phantom lines in FIG. 11. The slot 21b may be formed in another position. The tool 89 is engaged with the retaining member 71 to move it to the right in FIG. 11, until the winding-lock claw 78 of the shutter drive member 70 comes into mesh with the teeth 15a of the film winding wheel 15. While the retaining member 71 is held by the tool 89 in this position, the shutter button is depressed to release the shutter drive member 70. In this way, the first exposure frame 38b is not positioned in the exposure position until the photographer makes a preliminary winding.

Figure 14:
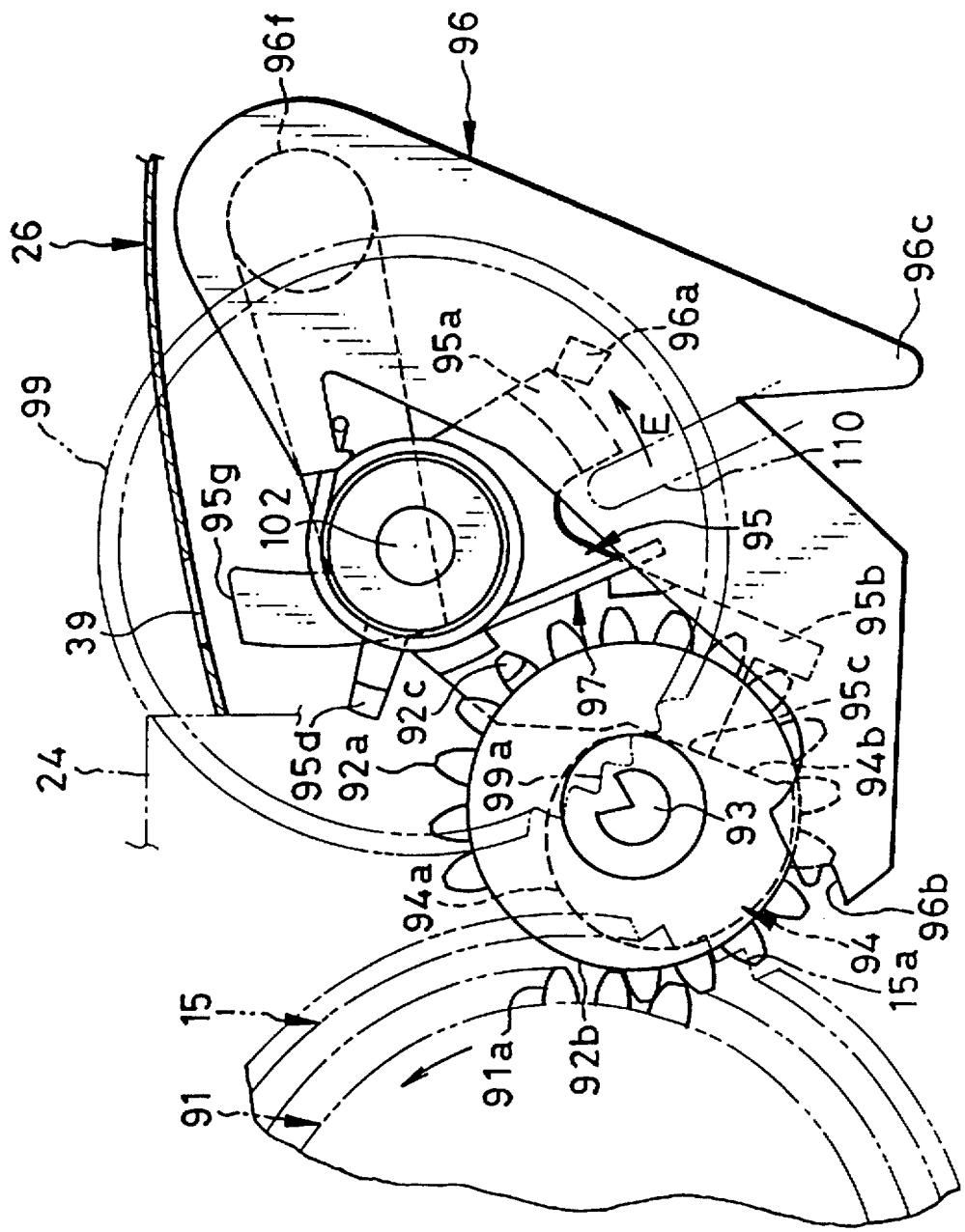
FIG. 14 is an explanatory plan view of the one-frame winding and shutter-charging mechanism of FIG. 13 in a release finish position.

FIGS. 13 and 14 show another embodiment of one-frame winding and shutter-charging mechanism which makes use of rotation of a film winding wheel 15 for shutter-charging, and which is mainly constituted of an interconnection gear 91, a pinion 92, a one-tooth gear 93, a cam 94, a shutter drive member or lever 95, a retaining member or lever 96, a coiled spring 97, a shutter blade 98, and a frame counter wheel 99. The interconnection gear 91 is disposed under the film winding wheel 15, and is formed coaxially integrally with the film winding wheel 15.

The pinion 92 has teeth 92a around its periphery except a limited angular portion 92b which will be called the no-tooth portion 92b. While the photo film 26 is wound up or moved by one-frame length, the pinion 92 is rotated about a shaft 101 in a clockwise direction from a gearing position to a non-gearing position. In the gearing position, the teeth 92a mesh with teeth of the interconnection gear 91. In the non-gearing position, the no-tooth portion 92b is opposed to the interconnection gear 91, disengaging the pinion 92 from the interconnection gear 91. The shaft 101 is formed on a base plate 100 which is formed integrally with a light-shielding chamber 33.

The cam 94 is formed under the pinion 92 as an integral part. The cam 94 has a charging cam surface 94a and a resetting cam surface 94b for resetting the pinion 92 to a home position. While the pinion 92 rotates from the gearing position to the non-gearing position upon the one-frame winding, the charging cam surface 94a comes into contact with a pushing edge 95c of the shutter drive member 95, and pushes it to rotate the shutter drive member 95 counterclockwise from a release end position shown in FIG. 14 to a charged position.

The shutter drive member 95 is rotatable about a shaft 102 formed on the base plate 100, and is urged by the coiled spring 97 to rotate clockwise toward the release end position. The shutter drive member 95 is formed as an integral part with a top ridge 95a, a striking arm 95b, the pushing edge 95c and a limiting arm 95d.

The retaining member 96 is formed as an integral part with a bottom ridge 96a, a winding-lock claw 96b, a releasing arm 96c, a top projection 96e, a rotary shaft 96f, and a detection hook 96g. The detection hook 96g protrudes radially from a lower end of the rotary shaft 96f to extend in the film winding direction. The other elements are formed at an upper end of the rotary shaft 96f. A distal end of the detection hook 96g is bent toward the photo film 26 and has a width slightly less than the length of the greater perforation 39 but larger than the length of the smaller perforation 40.

The retaining member 96 is rotatable about the rotary shaft 96f between a winding-lock position and an unlock position. In the winding-lock position where the winding-lock claw 96b is in mesh with the teeth 15a of the film winding wheel 15, the distal end of the detection hook 96g will protrude through a cut-out like the cut-out 33c, to be engaged in the greater perforation 39. In the unlock position, the distal end of the detection hook 96g removes from the greater perforation 39. The rotary shaft 96f is pivotally supported at its upper and lower ends by a pair of bearing portions 100a and 100b which are formed with the base plate 100. The retaining member 96 is urged by a coiled spring 97 toward the winding-lock position.

When the shutter drive member 95 rotates to the charged position, the top ridge 95a gets out of a rotational orbit of the bottom ridge 96a, so that the retaining member 96 rotates toward the winding-lock position under the force of the spring 97. At that time, however, the photo film 26 is not yet fed by one-frame length, so the retaining member 96 stops where the detection hook 96g comes into contact with the photo film 26. As a result of this slight rotation of the retaining member 96, the bottom ridge 96a comes into the rotational orbit of the top ridge 95a, to hold the shutter drive member 95 in the charged position. So long as the shutter drive member 95 is held in the charged position, the limiting arm 95d is engaged with a pin 92c of the pinion 92 to keep the pinion 92 from rotating toward the gearing position.

In this stage, the retaining member 96 does not reach the winding-lock position, that is, the winding-lock claw 96b is away from the teeth 15a, so that the rotation of the film winding wheel 15 is allowed. Since the interconnection gear 91 is locked in the non-gearing position, the rotation of the film winding wheel 15 will not be transmitted to the shutter drive member 95.

The detection hook 96g may not be engaged in the smaller perforation 40, but in the following greater perforation 39. First when the detection hook 96g is engaged in the greater perforation 39, the retaining member 96 moves to the winding-lock position to hinder the film winding wheel 15 from further rotation. Even this rotation, the retaining member 96 still holds the shutter drive member 95 in the charged position.

When a shutter button is depressed, the releasing arm 96c is pushed through a pressing rod, to rotate the retaining member 96 to the unlock position. Thereby, the bottom ridge 96a retracts from the rotational orbit of the top ridge 95a, letting the shutter drive member 95 rotate rapidly to the release end position under the force of the spring 97. The striking arm 95b strikes a shutter blade 98 on the way of rotation of the shutter drive member 95. After the shutter drive member 95 reaches the release end position, the top ridge 95a moves into the rotational orbit of the bottom ridge 94 to hold the retaining member 96 in the unlock position and, at the same time, the limiting arm 95d removes from the pin 92c to release the pinion 92 from the non-gearing position. Then, immediately before the shutter release member 95 reaches the release end position, the pushing edge 95c comes into contact with the resetting cam surface 94b of the cam 94, so that the pinion 92 is rotated to the gearing position. Thus, the film winding wheel 15 is enabled to transmit the rotation to the pinion 92.

On the top of the interconnection gear 91 is formed a one-tooth gear 93 integrally coaxially therewith. The one-tooth gear 93 mesh with teeth 99a formed around the frame counter wheel 99. The frame counter wheel 99 is rotatable about a shaft 102. The one-tooth gear 93 causes the frame counter wheel 99 to move one step while the pinion 92 rotates from the gearing position to the non-gearing position.

After completion of exposure of the last exposure frame 38a, upon the frame counter wheel 99 being moved one step by rotating the film winding wheel 15, a cam 99b disposed on the bottom of the frame counter wheel 99 is brought into a rotational orbit of the top ridge 96e of the retaining member 96, thereby holding the retaining member 96 in a film wind-up position between the winding-lock position and the unlock position. In the film wind-up position, the detection hook 96g of the retaining member 96 is off the photo film 26, and the winding-lock claw 96b is off the teeth 15a, whereas the bottom ridge 96a is in the rotational orbit of the top ridge 95a, to hold the shutter drive member 95 in the charged position. Accordingly, the photo film 26 is entirely wound into a cassette shell 24 without the detection hook 96g being engaged in an additional greater perforation 39a following the last exposure frame 38a.

Because the rotation of the film winding wheel 15 is directly utilized for shutter-charging, it is possible to charge the shutter drive member 95 by rotating the film winding wheel 15 independently of the perforations 39 and 40.

Therefore, in this type of film unit, there are two options in the method of shutter performance test: one is similar to the above described embodiments, wherein the shutter drive member 95 is charged by use of an external tool 110 as indicated by phantom lines and an arrow E in FIG. 14. For this method, the photo film 26 is initially drawn from the cassette shell 24 as far as the first exposure frame 38b passes over the exposure position behind an exposure aperture 33b a distance which is not less than the length of one frame, while being wound into a scroll 26a, prior to loading the scroll 26a and the cassette shell 24 into the film unit.

According to the first method of shutter performance test, the shutter drive member 95 is initially set in the release end position in the factory. Then, the tool 110 is inserted from outside through a not-shown slot, to move the shutter drive member 95 toward the charged position, as indicated by the arrow E in FIG. 14. When the shutter drive member 95 reaches the charged position, the bottom ridge 96a comes into the rotational orbit of the top ridge 95a to retain the shutter drive member 95 in the charged position. After the removal of the tool 110, the shutter release button is depressed to test the shutter performance.

In the second method of charging the shutter drive member 95 for the shutter performance test, the shutter drive member 95 is charged by rotating the film winding wheel 15, wherein the photo film 26 should initially be drawn farther from the cassette shell 24 compared with the first method. For example, the photo film 26 is drawn out as far as the lab space 38c passes over the exposure position a distance which is necessary for charging the shutter drive member 95, prior to loading of the scroll 26a of the photo film 26 and the cassette shell 24.

In either case, the first exposure frame 38b is initially drawn to a position one frame or more farther than the exposure position from the cassette shell 24. It is to be noted that the pinion 92 must be set in the gearing position in the first method, in order to prevent contact of the pushing edge 95c with the charging cam surface 94a the shutter drive member 95 from rotating to the release end position.

As described so far, according to the present invention, the photo film 26 is drawn from the cassette shell 24 as far as the first exposure frame 38b is set in a position one frame or more farther than the exposure position behind the exposure aperture 33b, when loading the scroll 26a of the photo film 26 and the cassette shell 24 in the film unit 10. Because a slot, e.g., the slot 21a or 21b, is formed to permit insertion of an external tool to move the shutter drive member to the charged position, the shutter performance test can be executed in this initial position without the need for winding the photo film to charge the shutter drive member.

As for the film unit having the one-frame winding and shutter-charging mechanism as shown in FIG. 13, it is alternatively possible to charge the shutter drive member by rotating the film winding wheel for the shutter performance test, if only the photo film 26 is initially drawn from the cassette shell 24 to an extent enough to permit winding the photo film 26 back into the cassette shell 24 by a length necessary for charging a shutter drive member for the shutter performance test, while keeping the first exposure frame 38*b* sufficiently away from the exposure position, to permit winding the photo film 26 again after the shutter performance test by the length necessary for charging the shutter drive member on or before the first exposure frame 38*b* being set in the exposure position by the preliminary winding.

The present invention should not be considered limited only to the above-described embodiments but, on the contrary, the present invention is applicable to any types of film units containing the photo film having a pair of perforations per frame along through the frame recording portion, without departing from the scope and spirit of the appended claims.

What is claimed is:

1. A lens-fitted photo film unit containing a cassette shell and a scroll of unexposed photo film previously drawn from said cassette shell with its trailing end secured to a spool of said cassette shell, so as to be wound into said cassette shell by one frame after each exposure, said photo film having a pair of perforations per frame along through a limited length of frame recording portion available for photographing frames, said lens-fitted photo film unit comprising:

a film winding device rotatable for winding said photo film into said cassette shell;

a shutter device for making an exposure when released from a charged position;

a winding-lock device for stopping said photo film from being wound when said photo film has been wound by one frame, said winding-lock device being engageable in said perforations;

a slot for permitting insertion of a tool to set said shutter device to the charged position; and conveying means for conveying the photo film to a position, responsive to said shutter device being set to said charged position, at which a first exposure frame nearest to the trailing end of said photo film, is set in a position at least one frame beyond an exposure position of said film unit, with respect to said cassette shell.

2. A lens-fitted photo film unit according to claim 1, wherein said conveying means comprises a mechanism which is engageable in said perforations of said photo film to set said shutter device in the charged position in cooperation with said perforation being advanced while said photo film is wound one frame or less by rotating said film winding device.

3. A lens-fitted photo film unit according to claim 1, wherein said conveying means comprises a mechanism which cooperates with said film winding device to set said shutter device in the charged position while said film winding device is rotated to wind said photo film by one frame or less.

4. A lens-fitted photo film unit containing a cassette shell and a scroll of unexposed photo film previously drawn from said cassette shell with its trailing end secured to a spool of said cassette shell, so as to be wound into said cassette shell one frame after each exposure, said photo film having a pair of perforations per frame along through a limited length of frame recording portion available for photographing frames, said lens-fitted photo film unit comprising:

a film winding device rotatable for winding said photo film into said cassette shell;

a shutter device for making an exposure when released from a charged position;

a winding-lock device engageable in said perforations to stop said photo film from being wound when said photo film has been wound by one frame; and a shutter charging mechanism which cooperates with said film winding device to charge said shutter device while said film winding device is rotated to wind said photo film by one frame or less;

wherein said photo film is drawn from said cassette shell to a position at which a first exposure frame that is nearest to the trailing end of said photo film, is set in a position at least one frame beyond an exposure position of said film unit, with respect to said cassette shell.

5. A lens-fitted photo film unit according to claim 4, wherein said shutter charging mechanism draws said photo film from said cassette shell to an extent far enough to permit winding said photo film back into said cassette shell by a length necessary to charge said shutter device, while keeping the first exposure frame nearest to the trailing end away from the exposure position, far enough to permit winding said photo film again by the length necessary for charging said shutter device, on or before the first exposure frame nearest to the trailing end, is set in the exposure position.

\* \* \* \* \*